United States Patent [19]

Yanagawa

[11] 4,336,598
[45] Jun. 22, 1982

[54] ELECTRONIC CALCULATOR WITH MUSICAL NOTE GENERATION

[75] Inventor: Mikio Yanagawa, Akishima, Japan

[73] Assignee: Casio Computer Co., Ltd., Tokyo, Japan

[21] Appl. No.: 97,841

[22] Filed: Nov. 27, 1979

[30] Foreign Application Priority Data

Nov. 30, 1978 [JP] Japan .................................. 53-148143

[51] Int. Cl.³ .............................................. G06F 3/16
[52] U.S. Cl. ................................................ 364/710
[58] Field of Search ..................... 364/710; 179/1 SM

[56] References Cited

U.S. PATENT DOCUMENTS

| | | | |
|---|---|---|---|
| 4,000,565 | 1/1977 | Overby et al. | 364/710 X |
| 4,179,584 | 12/1979 | Tanimoto et al. | 364/710 X |
| 4,185,169 | 1/1980 | Tanimoto et al. | 364/710 X |
| 4,211,892 | 7/1980 | Tanimoto et al. | 364/710 X |

FOREIGN PATENT DOCUMENTS

| | | |
|---|---|---|
| 2354042 | 5/1974 | Fed. Rep. of Germany . |
| 1307681 | 2/1973 | United Kingdom . |
| 1523776 | 9/1978 | United Kingdom . |
| 1529219 | 10/1978 | United Kingdom . |

OTHER PUBLICATIONS

"Calculators Supply Answers Audibly or in Braille" *Electronics* Nov. 27, 1975, pp. 39-40.

"'Talking' Calculator Announces Keystroke, Answer", *New Equipment Digest*, Apr. 1976.

*Primary Examiner*—David H. Malzahn
*Attorney, Agent, or Firm*—Frishauf, Holtz, Goodman & Woodward

[57] ABSTRACT

When a key of a key-in section is operated and when an operation unit produces the result of operation, a display is performed on the basis of the keyed-in data and the operation result data stored in the memory unit, while at the same time the notes corresponding to the data are sounded under control of a sound control circuit.

6 Claims, 5 Drawing Figures

FIG. 2

| DISPLAY DATA | — | 0 | 1 | 2 | 3 | 4 | 5 | 6 | 7 | 8 | 9 | . | E | [+] | [−] | [×] | [÷] | — |
|---|---|---|---|---|---|---|---|---|---|---|---|---|---|---|---|---|---|---|
| MUSICAL SCALE | B3 | C4 | C4# | D4 | D4# | E4 | F4 | F4# | G4 | G4# | A4 | A4# | B4 | C5 | C5# | D5 | D5# | — |
| FREQUENCY | 246.9 | 261.6 | 277.2 | 293.7 | 311.1 | 329.6 | 349.2 | 370.0 | 392.0 | 415.3 | 440 | 466.2 | 493.9 | 523.3 | 554.4 | 587.3 | 622.3 | — |
| BIT TIME | 66 | 63 | 59 | 56 | 53 | 50 | 47 | 44 | 42 | 39 | 37 | 35 | 33 | 31 | 30 | 28 | 26 | — |

ELECTRONIC CALCULATOR WITH MUSICAL NOTE GENERATION

The present invention relates to an electronic calculator adapted to produce a musical note based on the key input data and the calculation result data to be displayed by a display device.

There has been provided a small electronic calculator which emits sounds with a given pitch when keys are depressed, or emits notes, such as do, re, mi, and the like, in each scale respectively corresponding to the keys, to check the keying-in operations.

With the conventional calculator of this type, an operator can indeed check the keying-in operation aurally. However, he must check the operation data visually. Particularly, when a long calculation is performed continuously, the operator always visually checks both the keys to be operated and the data displayed.

Accordingly, an object of the invention is to provide a small electronic calculator in which the key input data and calculation result data is displayed and corresponding musical notes are produced, thereby to confirm the data to an operator visually and aurally.

SUMMARY OF THE INVENTION

To achieve the above object, there is provided an electronic calculator comprising a key-in section having entry keys, operation command keys and the like, calculation means to execute a given calculation on the basis of the input data keyed in from the key-in section; memory means for storing the result of the calculation and the key-in data supplied from the key-in section; and note generating means for generating data stored or to be stored in the memory means corresponding to the corresponding notes in a given scale.

With such a construction an electronic calculator according to the invention produces the notes in a musical scale corresponding to the data at the time of the key-in operation and at the time of displaying the result of calculation as well. Accordingly, an operator can recognize the data keyed in or the result of calculation aurally and/or visually. The operator can recognize an erroneous key operation in a simple manner. The device is very useful for the blind.

According to this invention, while calculation is effected, a musical note corresponding to the operation of the ten keys is produced as if a piece of music were played. A musical note corresponding to the calculation result data is also produced as if a piece of music were played, when the calculation result data is displayed. Therefore, there is an advantage that the operator can effect calculation while enjoying a piece of music.

BRIEF DESCRIPTION OF THE DRAWINGS

FIG. 2 is a table tabulating the correspondence among display data, musical scale, frequency, and bit time;

DETAILED DESCRIPTION

Figure 1:
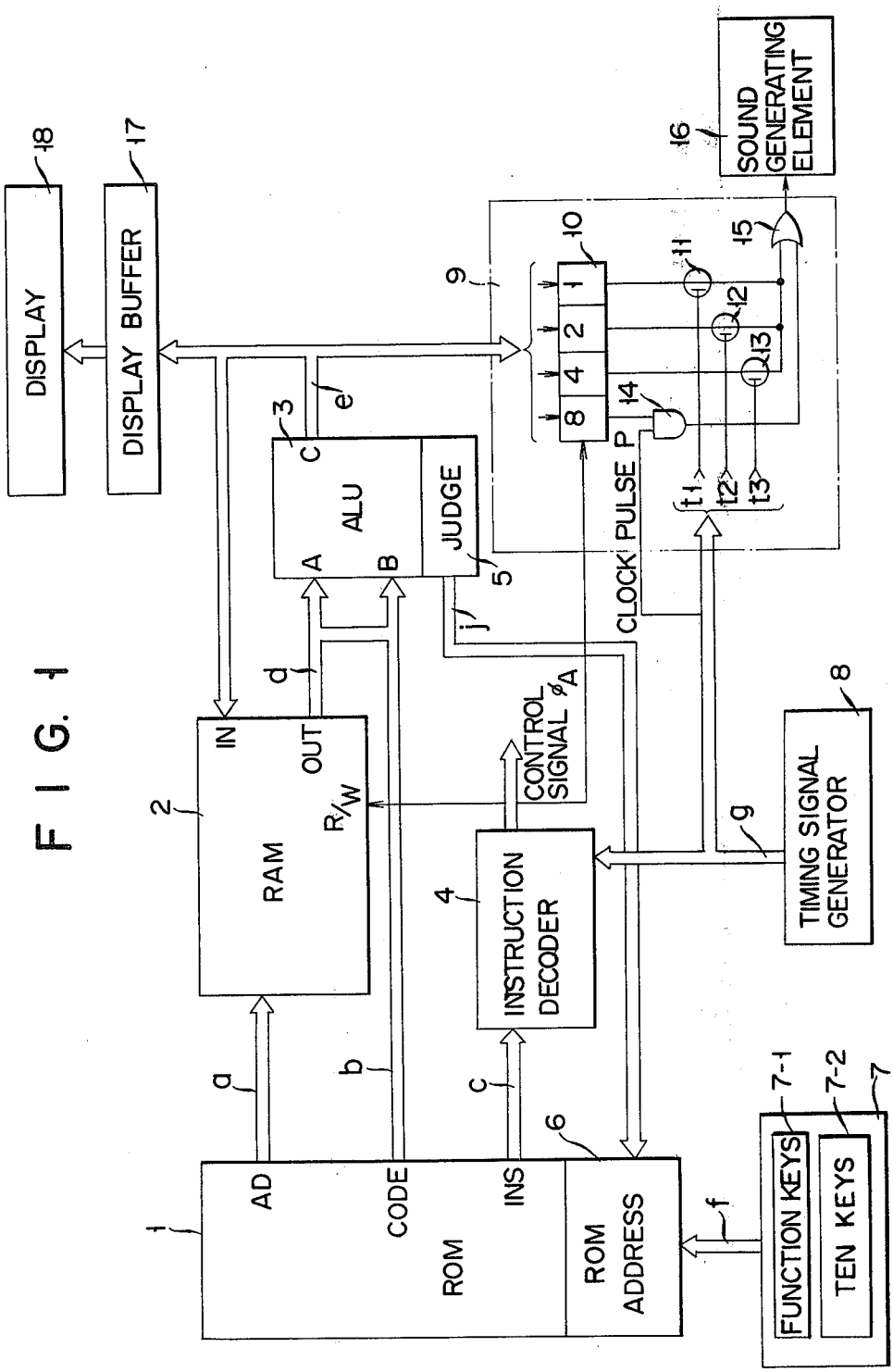
FIG. 1 is a block circuit diagram illustrating an embodiment of the invention.

Referring now to FIG. 1, there is shown an overall circuit construction of an embodiment of the invention. In FIG. 1, reference numeral 1 designates a ROM (read only memory) for storing various microinstructions (control program). The ROM 1 produces in parallel through bus lines a, b and c various signals such as an address signal AD for specifying row addresses and column addresses of the resistor such as X, Y and Z registers of an RAM (random access memory) 2 as an operation memory, a code signal CODE applied to an operation unit 3 where a code operation is performed, and instruction signal INS to instruct an instruction decoder 4 to produce various control signals.

The data in a RAM 2 specified by the address signal AD is outputted from the output terminal OUT and is selectively inputted to a first input terminal A and a second input terminal B of the operation unit 3, through the bus line d. The code signal CODE is further applied to the second input terminal B of the operation unit 3. Under control of the control signals applied from the instruction decoder 4, the operation unit 3 executes various operations and transfers the operation result to an input terminal IN of a RAM 2 through a bus line e. At this time, the RAM 2 receives the address signal AD specifying a column address and row address of a register into which the operation result is stored. Upon receipt of the address signal AD, the operation result is stored into a specific digit of the specified register. A judgement circuit 5 judges presence or absence of a carry (borrow) of the operation result from the operation result or presence or absence of data, thereby to produce a judgement signal J. The judgement signal J is transferred to a ROM address unit 6 to specify an address for the next step in the ROM 1, together with the next address signal (not shown).

Further, a key operation information of a key-in section 7 including various function keys 7-1 and ten keys 7-2 is applied to the ROM address unit 6, through the bus line f, thereby to specify a key-in processing flow for the ROM 1. Various timing signals produced from a timing signal generator 8 are applied through a bus line g to the instruction decoder 4, so that the instruction decoder 4 produces various control signals as mentioned above to control the operations of the respective circuits shown in FIG. 1 as well as the operation unit 3. The instruction decoder 4 additionally produces a read/write signal R/W to instruct the RAM 2 to perform a read and a write operation, and a signal $\phi_A$ to control the data read-in operation of a buffer register (referred to as a register 10) within a sound control circuit 9.

The timing signal generator 8 produces basic clock pulses $\phi 1$ and $\phi 2$ with different phases as shown in FIGS. 5(a) and 5(b) and the frequency, for example, 16384 Hz, and forms timing signals t1 to t3 of three phases, and a clock pulse P for an alarm (to be described later) which in turn are applied to the instruction decoder 4, the sound control circuit 9 and necessary circuits shown in FIG. 1.

The construction of the sound control circuit 9 will be described. In response to the signal $\phi_A$, data from the RAM 2 is applied through the operation unit 3 to the respective bits of the register 10 of 4-bit construction, and stored therein. Of those data stored in the register 10, the signals in the 1st to 3rd bits (weighted "1", "2" and "4" respectively) are inputted into gate circuits 11, 12 and 13 which are sequentially enabled by the timing signals t1 to t3 and then are applied to a sound generating element 16 such as a piezo-electric element, through an OR circuit 15, to thereby make the sound generating element 16 sound. For operating the sound generating element 16 for the purpose of alarm, numeral "8" is loaded into the register 10 and an AND circuit 14 is conditioned by the clock pulse P to drive the sound generating element 16 to produce an alarm sound.

The display data such as entry data and the operation result are supplied from the operation unit 3 through the bus line e to a display buffer 17 and is then visualized by a display unit 18.

The operation of the small calculator described above will be described. FIG. 2 tabulates the correspondence among the musical scales of notes corresponding to the individual display data, the frequencies, and the scales. With respect to various symbols; "−" for a minus sign, 0 to 9 for numerals, "." for a decimal point, "E" for an error, and +, −, ×, ÷, a note (B3) in the musical scale B of a third octave to a note ($D_5^\#$) of the musical scale $D^\#$ of a fifth octave will be sounded in the following manner.

Let us consider a case where "73.4+5=78.4" for example, is performed by the calculator of the invention. Firstly, a numeral key 7 of the ten keys 7-2 in the key-in section 7 is operated as shown in FIG. 3(a). As a result, the key-in input data "7" is transferred into an entry register, for example, an X register in the RAM 2 and stored therein. See FIG. 3(c). In FIG. 3(c), P designates a decimal point designation digit and represents "7." in this case. At this time, the data "7" is transferred to the display unit 18 and is displayed as shown in FIG. 3(b). At the same time, a musical sound preparation flow for the data "7" shown in FIG. 4 is performed under control of ROM 1. In a step S1 shown in FIG. 4, "3" as the code signal CODE is read out from the ROM 1 and is loaded into the 3rd digit of the Z register, through the operation unit 3. Similarly, in steps S2 and S3, "9" and "0" as the code signals CODE are produced from the ROM 1 and are loaded into the 2nd and the 1st digit of the Z register. The data "390" inputted through the steps S1 to S3 relates to a sounding time (one second in this example) and specifically represents reproducing times of the musical sound wave with 390.095 Hz actually reproduced for the musical scale G4. The frequency 390.095 . . . Hz is a frequency with a period T having 42-bit time when the period of the basic clock $\phi 1$ and $\phi 2$ (16384 Hz) is used as one bit time.

Following the step S3, a step S4 is executed. Like the steps S1 to S3, as in the steps S1 to S3, the step S4 writes "7" into the 8th digit of the Z register. Then, a step S5 is executed in which the data "7" in the 8th digit ("0111" in binary expression) is transferred to the register 10 while at the same time the signal $\phi_A$ shown in FIG. 5(f) is applied from the instruction decoder 4 to the register 10 thereby to store the data "7" into the register 10. The CPU steps to a step S6 in the program execution wherein the data in the 1st to 5th digits are transferred to the 1th to 5th digits of the original register Z, through the operation unit 3. In this step, the operation unit operates nothing. In the operation, 3-bit time is required for the transfer time of each digit and therefore 15-bit time is needed to complete all the operations in the step S6. During this time, timing signals t1 to t3 are applied as gate signals to the gate circuits 11 to 13 in this order, with the result that the output signal of the OR circuit 15 is "1" during the period of 15 bits, as shown in FIG. 5(h), and the sound generating element 16 starts its sounding.

Then, a step S7 is executed. In this step, "7" in the 8th digit is cleared. This step requires 3-bit time for its operation. The program execution advances to a step S8 where "0" in the 8th digit is transferred to the register 10 to clear the 1st to 3rd bit of the register 10. The operation in the step S5 is similar to that of the step S8 and loads "0" into the 1st to 3rd bits of the register 10. In this way, "1" is continuously applied to the sound generating element 16 during the period of steps S6 to S8 (21-bit time).

In a step S9 to be executed, the contents of the 1st and 2nd digits in the Z register are transferred again to the same digits for the 6-bit time. This step executes none of the operations like the step S6. As the S9 starts to be executed, "0" signal stored in the 1st to 3rd bits of the register 10 is transferred to the OR circuit 15, through the gates 11 to 13, so that the output of the OR circuit 15 is inverted to be "0" as shown in FIG. 5(h).

The program execution then enters a step S10 to cause the operation unit 3 to substract "1" from the data "390" in the 1st to 3rd digits in the Z register. The result of the subtraction is inputted again to the RAM 2. At the same time, the judgement circuit 5 judges if the subtraction result is equal to "0" or not. In this case, the subtraction result is "389", so that the step S4 is executed again to be followed by the executions following the step S4. Accordingly, in the course of the execution (21-bit time) of the steps S9→S10→S4→S5, one cycle of the sound reproduction is completed as shown in FIGS. 5(g), 5(h), and 5(i), with the time (21 bits) that the output of the OR circuit 15 is "1" through the steps S6 to S8.

Similarly, executions of S6 through S8 and S9-S10-S4-S5 are alternately repeated until the contents of the 1st to 3rd digits of the Z register becomes "0". Through the execution, the musical sound in the scale G4 is generated for one second. After the depression of the numeral key 7, the numeral key 3 is depressed to transfer data 3 to the 1st digit of the X register. The data "7" is stored. See FIG. 3(c). As a result, the display unit 18 displays "73." as shown in FIG. 3(b). At this time, the corresponding scale $D_4^\#$ is sounded for one second, as shown in FIG. 2. In this case, the period of the musical sound $D_4^\#$ corresponds to 53-bit time. Actually, the frequency of the musical sound produced from the sound generating element 16 is 309.132 . . . Hz. For example, the sound generating element 16 generates the sound of the scale $D_4^\#$ by setting the time taken for the output of the OR circuit 15 to be "1" to 26 bit-time, and the time for it to be "0" to 27-bit time. If so done, "3" (=0, 0, 1, 1), "4" (=0, 1, 0, 0), "1" (=0, 0, 0, 1) and "6" (=0, 1, 1, 0), in addition to "7" (=0, 1, 1, 1) and "0", are sequentially inputted to the register 10 when the output of the OR circuit 15 is inverted for 3-bit time. Also in other scales with the bit time being not a multiple of 3, it is possible to generate a sound with the frequency approximate to the true sound frequency, if numeral values properly compensated are inputted to the register 10 when the output of the OR circuit 15 is inverted. In order to generate the sound of the scale $D_4^\#$ for a given time, for example, one second, the wave-shaping process is repeated 309 times to make a sound of the scale $D_4^\#$, as shown in FIG. 3(e). Incidentally, the detailed sound-forming process for the scale $D_4^\#$ will be omitted.

Following this, the decimal point key ⬚, the numeral key 4, the addition key +, the numeral key 5 are subsequently depressed, "73.4" is transferred from the X register to the Y register. At the same time, the musical sounds of the scales $A_4^\#$, $E_4$, $C_5$ and $F_4$ corresponding to the displays ".", "4", "+" and "5" are sequentially sounded by the sound generating element 16 each for one sound, as shown in FIGS. 3(a) to 3(e).

When the equal key = is depressed, the data corresponding digits of the X register and the Y register are sequentially transferred to the operation unit 3 where those are subjected to an addition operation. Then, the result of the operation is stored in the X register as shown in FIG. 3(c) while it is displayed in the display unit 18 as shown in FIG. 3(b). Further, the musical sound generating process is similarly performed to produce the musical sounds in the scales $G_4$, $G_4^\#$, $A_4^\#$ and $E_4$ corresponding to the display data "7", "8", "." and "4".

In the embodiment of the invention, it is possible to generate sounds in the scales corresponding to the respective display data each for a given time, for both the keyed-in data in accordance with the key operation and the display data representing the operation result.

Although the sounding time of each musical sound is set to one second in the above-mentioned embodiment, it is not limited to such. For example, in keying in data, the sounding time may be properly set by adjusting the key depression time. Further, the correspondence between the display data and the scales may be properly changed, if necessary. By sounding without use of halftones, the device allows any person to learn the display data only aurally. The circuit construction to make a sound is not limited to the one of the described embodiment. Any other suitable modification thereof is possible in the circuit construction to generate sounds. By using a switch to start or stop the sounding, the display data may be sounded only when it is necessary.

What is claimed is:

1. An electronic calculator with musical note producing and sounding means, comprising:
    key input means (7) including ten keys representing respective numerals and function keys representing respective functions, said ten keys and said function keys generating input information corresponding to numerals and functions when actuated, at least said keys of said ten keys having a corresponding relation to respective different musical notes;
    memory means (2) coupled to said key input means (7) and including means for storing said input information;
    calculation means (3) coupled to said memory means (2) for receiving signals corresponding to said input information and including means for performing at least one calculation with respect to said input information to produce calculation result data for each calculation and means for generating any one of said calculation result data corresponding to the numerals representing the result of said at least one calculation;
    said memory means (2) further including means for storing said calculation result data generated by said calculation means (3) in accordance with said input information;
    display means (18) coupled to said calculation means (3) for displaying the numerals representing at least one of said input data and said calculation result data as display data;
    timing signal generating means (8) for generating timing signals and coupled at least to said calculation means and memory means (2) for sending timing signals at least to said calculation means and to said memory means;
    control means (1) coupled to said key input means (7) for delivering pre-set code signals corresponding to said numerals of said display data, so that a frequency signal corresponding to the musical note can be obtained;
    note generating means coupled to said calculation means (3), to said control means (1) and to said timing signal generating means, and including means responsive at least to a code signal from said control means and to said timing signals for producing a frequency signal of a musical note corresponding to a respective numeral of said display data, on the basis of a code signal outputted from said control means (1) and the timing signal from said timing signal generating means; and
    sound generating means coupled to said note generating means for generating the respective musical note corresponding to a respective numeral of said display data upon receipt of said frequency signal.

2. The electronic calculator of claim 1, wherein said note generating means comprises a buffer (10) which comprises a plurality of bits and which receives said code signals from said control means (1); and a gate circuit (11, 12, 13, 15) coupled to said timing signal generating means and to said buffer (10) for controlling output signals of the respective bit positions of said buffer by the timing signal of said timing signal generating means (18) in ON-OFF fashion to generate said frequency signal of said musical note.

3. The electronic calculator of claim 1 or claim 2, wherein said sound generating means comprises a piezo-electric sound generating element.

4. The electronic calculator of claim 1 or claim 2, wherein said sound generating means generates a plurality of successive respective musical notes corresponding to respective numerals of a multi-numeral display data.

5. The electronic calculator of claim 1 or claim 2, wherein said function keys include an "equal" key, and wherein said sound generating means generates respective musical notes corresponding to respective numerals of said calculation result data responsive to depression of said "equal" key.

6. The electronic calculator of claim 1 or claim 2, wherein said calculation result data comprises a plurality of numerals in a given order, and wherein said sound generating means generates a plurality of successive respective musical notes corresponding to respective numerals of a multi-numeral display of said calculation result data, said musical notes being generated in the order of the numerals of said displayed calculation result data.

* * * * *

UNITED STATES PATENT AND TRADEMARK OFFICE
CERTIFICATE OF CORRECTION

PATENT NO. : 4,336,598

DATED : June 22, 1982

INVENTOR(S) : Mikio YANAGAWA

Figure 3:
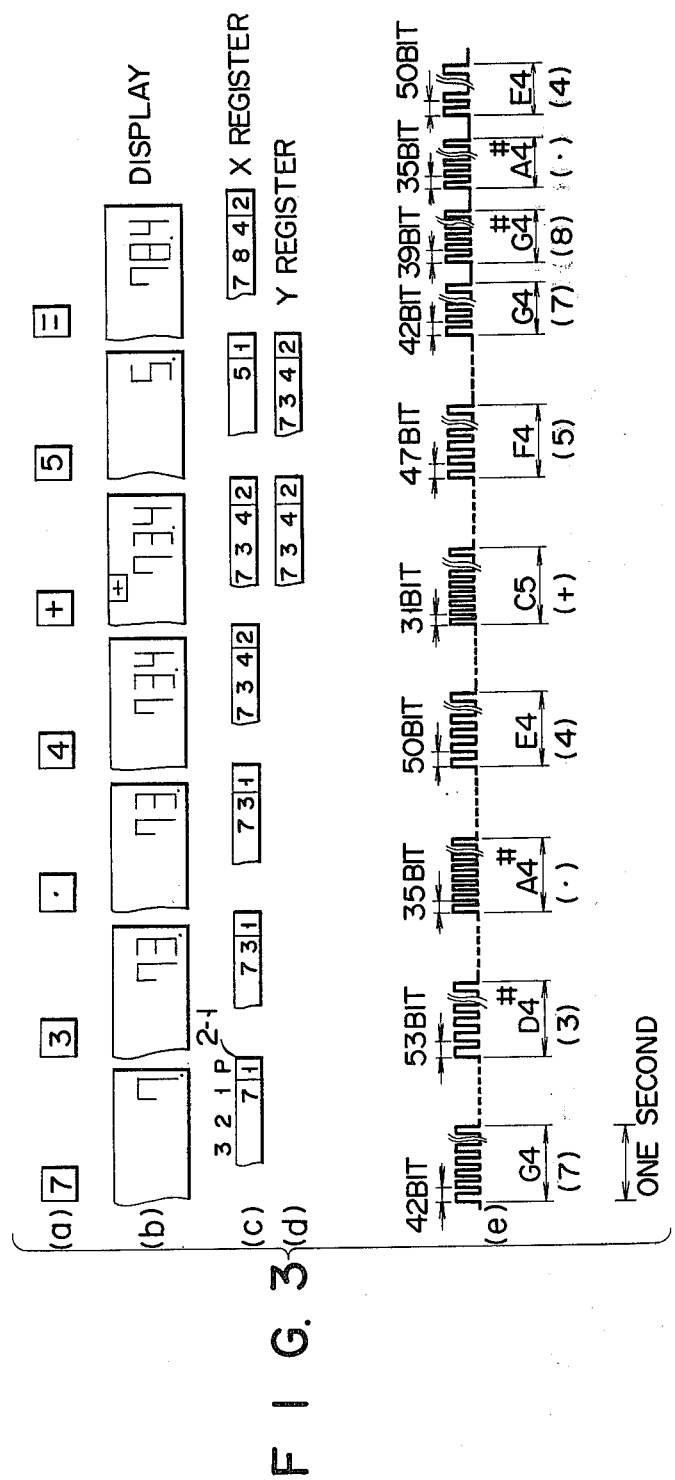
FIGS. 3(a) to 3(e) show displays and notes sounded in association therewith when a specified operation is performed with the embodiment shown in FIG. 1.
Figure 4:
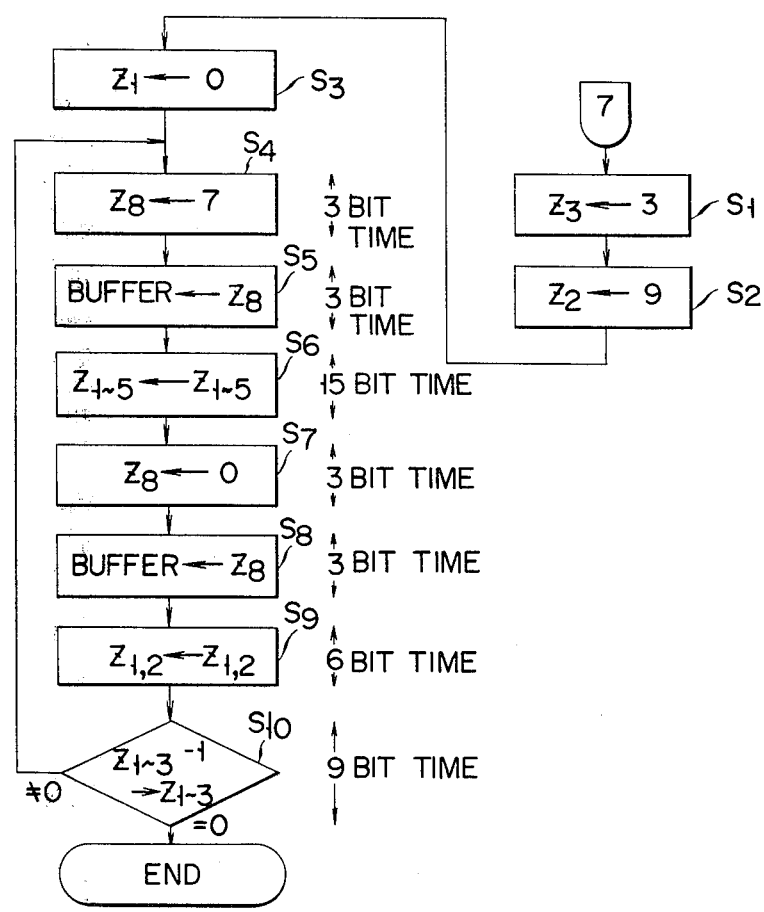
FIG. 4 is a flow chart for producing notes corresponding to some display data of the embodiment shown in FIG. 1.
Figure 5:
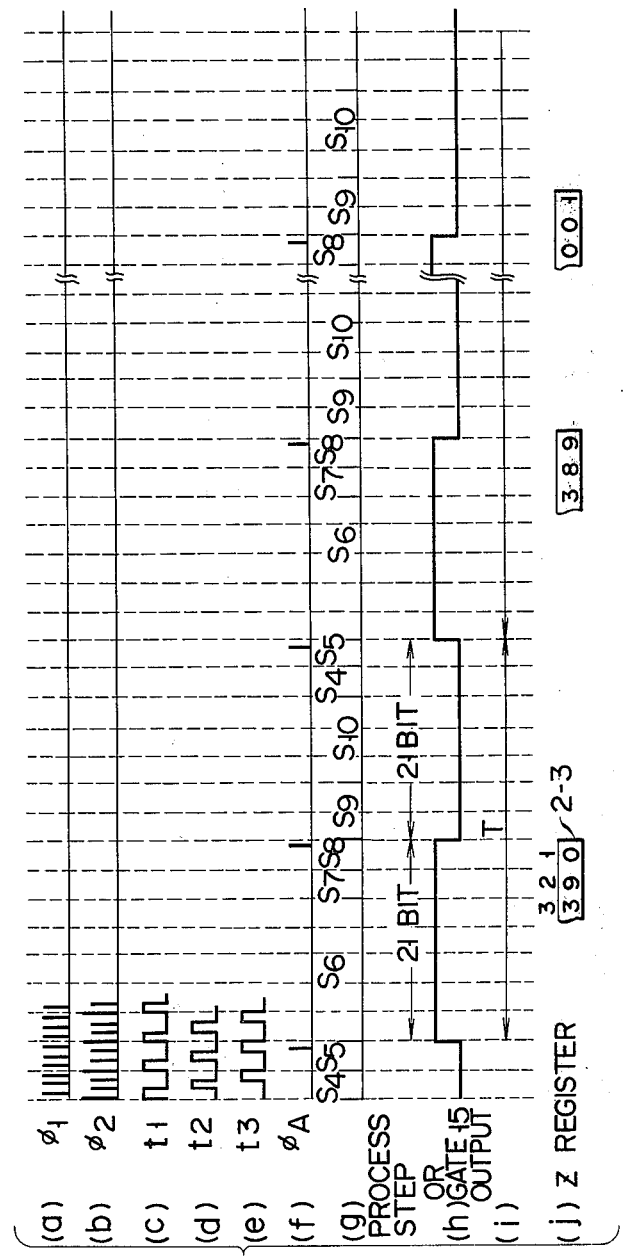
FIGS. 5(a) to 5(j) are timing charts useful in explaining an operation of the embodiment shown in FIG. 1.

It is certified that error appears in the above-identified patent and that said Letters Patent is hereby corrected as shown below:

IN THE DRAWINGS:

FIG. 3, delete the legend "2-1";

FIG. 5, delete the legend "2-3".

Signed and Sealed this

Twenth-eighth Day of September 1982

[SEAL]

Attest:

GERALD J. MOSSINGHOFF

Attesting Officer    Commissioner of Patents and Trademarks